United States Patent [19]

Takahashi

[11] Patent Number: 5,057,952
[45] Date of Patent: Oct. 15, 1991

[54] MAGNETIC FLUID SEALING APPARATUS FOR A MAGNETIC DISK DRIVE

[75] Inventor: Atsushi Takahashi, Iruma, Japan

[73] Assignee: Kabushiki Kaisha Toshiba, Kanagawa, Japan

[21] Appl. No.: 457,109

[22] Filed: Dec. 26, 1989

[30] Foreign Application Priority Data

Dec. 28, 1988 [JP] Japan .................................. 63-332523

[51] Int. Cl.$^5$ ............................................. G11B 33/14
[52] U.S. Cl. .................................... 360/97.02; 277/80
[58] Field of Search ............... 360/99.08, 97.02, 97.03; 277/80

[56] References Cited

U.S. PATENT DOCUMENTS

| | | | |
|---|---|---|---|
| 4,531,846 | 7/1985 | Raj | 277/80 X |
| 4,575,103 | 3/1986 | Pedu | 277/80 |
| 4,989,885 | 2/1991 | Iwata | 277/80 |

OTHER PUBLICATIONS

Basic Theory and Experiment of Magnetic Fluid Seals by Shinichi Kamiyama, Institute of High Speed Mechaniscs, Tohoku University, pp. 379-382, May 29, 1984.

Magnetic Fluid Seals, by Shin-ichi Kamiyama, Institute of High Speed Mechanics, Tohoku University, pp. 619-622, Aug. 30, 1985.

Magluid Seal No. TR-84MF01, TR-84MF02, Technology Materials Department, Materials Research Center, Nippon Seiko, Inc.

Primary Examiner—A. J. Heinz
Attorney, Agent, or Firm—Finnegan, Henderson, Farabow, Garrett, and Dunner

[57] ABSTRACT

A magnetic fluid sealing apparatus closes a portion between a shaft member provided at a rotation center and an external member concentrically arranged outside the shaft member. This magnetic fluid sealing apparatus includes magnetic circuit forming means, fixed to the external member, for forming a magnetc circuit between the magnetic circuit forming means and the shaft member, and a magnetic fluid held between the shaft member and the magnetic circuit forming means by the magnetic circuit. The magnetic fluid sealing apparatus also includes a scattering preventing means arranged close to the magnetic fluid and having a nonmagnetic material projecting from the magnetic circuit forming means toward the shaft member.

10 Claims, 3 Drawing Sheets

MAGNETIC FLUID SEALING APPARATUS FOR A MAGNETIC DISK DRIVE

FIELD OF THE INVENTION AND RELATED

The present invention relates to a magnetic fluid sealing apparatus utilized to seal shafts of various rotating mechanisms and, more particularly, to a magnetic fluid sealing apparatus for preventing scattering of a magnetic fluid caused by a centrifugal force upon rotation.

Recently, a magnetic fluid sealing apparatus has been developed as a mechanism for sealing a shaft of a rotating mechanism and utilized in various rotating mechanisms.

In a magnetic disk drive, for example, since even small dust adhered on a magnetic disk causes a trouble, a magnetic disk must be kept in a closed clean environment so that no dust adheres on the disk. Therefore, in order to separate a magnetic disk from a driving unit such as a motor as a source of dust, a magnetic fluid sealing apparatus is provided in a magnetic disk rotating mechanism.

FIG. 1 shows a conventional magnetic disk drive of this type. This magnetic disk drive has an air-tight disk housing 101. A spindle motor 105 for rotating a plurality of magnetic disks 103 stacked with predetermined intervals therebetween is located in the disk housing 101. An actuator 109 for positioning a plurality of magnetic heads 107 on the contact with predetermined positions of the magnetic disks 103 is located in the disk housing 101.

The spindle motor 105 has a central shaft 111, and a cylindrical member 117 rotatably supported by the central shaft 111 via bearings 113 (upper side) and 115 (lower side). The magnetic disks 103 are fixed outside the cylindrical member 117.

A plurality of coils 119 are arranged around the central shaft 111, and a plurality of motor magnets 121 are arranged inside the cylindrical member 117 so as to oppose the coils 119. The cylindrical member 117 and the magnetic disks 103 are rotated around the central shaft 111 by the coils 119 and the motor magnets 121.

A magnetic fluid sealing apparatus 123 is provided above the bearing 113 of the spindle motor 105.

FIGS. 2 and 3 show the magnetic fluid sealing apparatus 123 provided in a region indicated by reference symbol A shown in FIG. 1 in an enlarged scale. FIG. 2 is a longitudinal sectional view, and FIG. 3 is a plan view.

As shown in FIGS. 2 and 3, the magnetic fluid sealing apparatus 123 comprises a magnetic circuit forming means constituted by two pole pieces 125 (upper side) and 127 (lower side) which are annular plates consisting of a magnetic material, and an annular magnet 129 sandwiched between the pole pieces 125 and 127. The inner diameter of the magnet 129 of the magnetic circuit forming means is set to be larger than that of the pole pieces 125 and 127. Therefore, the inner peripheral portions of the pole pieces 125 and 127 project toward the central shaft 111, and a magnetic circuit is formed between the magnetic circuit forming means and the central shaft 111 by using the pole pieces 125 and 127 as magnetic poles.

This magnetic circuit holds a magnetic fluid 131 between the inner peripheral portions of the pole pieces 125 and 127 and the central shaft 111, thereby air-tightly closing a portion between the pole pieces and the central shaft.

The magnetic fluid sealing apparatus 123 prevents scattering of dust produced in, e.g., the bearing 113 as a sliding portion, thereby preventing the dust from adhering on the magnetic disks 103. Note that in the magnetic disk drive shown in FIG. 1, if the magnetic fluid sealing apparatus 123 is provided not only above the bearing 113 but also below the bearing 115, scattering of dust can be prevented more reliably.

In the magnetic fluid sealing apparatus 123 having the above arrangement, as shown in FIG. 4A, the magnetic fluid 131 is held between the inner peripheral portion of the pole pieces 125 and 127 and the central shaft 111 by the magnetic circuit.

Since, however, the cylindrical member 117 to which the pole pieces 125 and 127 and the magnet 129 are fixed is rotated at high speed, e.g., 3,600 rpm, a strong centrifugal force acts on the magnetic fluid 131. If the centrifugal force exceeds a magnetic force for holding the magnetic fluid 131, the magnetic fluid 131 moves in the radial direction and is scattered, as shown in FIG. 4B.

If the magnetic fluid 131 is scattered as described above, sealing properties (a dust-proof property and air-tightness) of the magnetic fluid sealing apparatus 123 may be degraded, or the scattered magnetic fluid 131 may adhere on the magnetic disks 103 to cause contamination and failure of the magnetic disk drive.

OBJECT AND SUMMARY OF THE INVENTION

It is, therefore, an object of the present invention to provide a magnetic fluid sealing apparatus capable of preventing degradation in sealing properties of the magnetic fluid sealing apparatus caused when a magnetic fluid is scattered by a centrifugal force upon rotation.

It is another object of the present invention to provide a magnetic fluid sealing apparatus capable of preventing a trouble caused when a magnetic fluid is scattered to adhere on another portion (e.g., a magnetic disk) by a centrifugal force upon rotation.

That is, according to the present invention, a magnetic fluid apparatus for sealing a portion between a shaft member provided at a rotation center and a external member concentrically arranged outside said shaft member, comprising: magnetic circuit forming means, fixed to said external member, for forming a magnetic circuit between said magnetic circuit forming means and said shaft member, a magnetic fluid held between said shaft member and said magnetic circuit forming means by said magnetic circuit, and a scattering preventing means for preventing scattering of said magnetic fluid to a surrounding portion, said scattering preventing means arranged close to said magnetic fluid and projecting from said magnetic circuit forming means side toward said shaft member.

DETAILED DESCRIPTION OF THE PREFERRED EMBODIMENTS

Embodiments of the present invention will be described below with references to the accompanying drawings.

Figure 1:
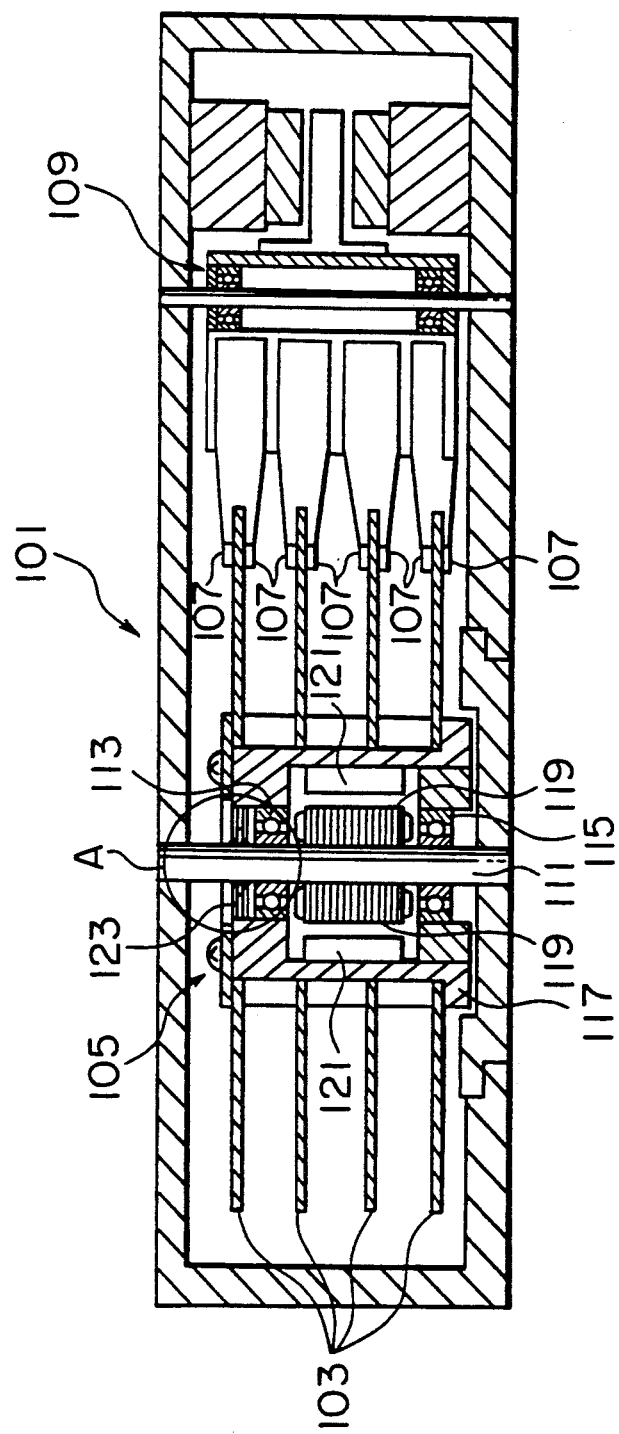
FIG. 1 is a substantially sectional view showing a magnetic disk drive having a magnetic fluid sealing apparatus.
Figure 2:
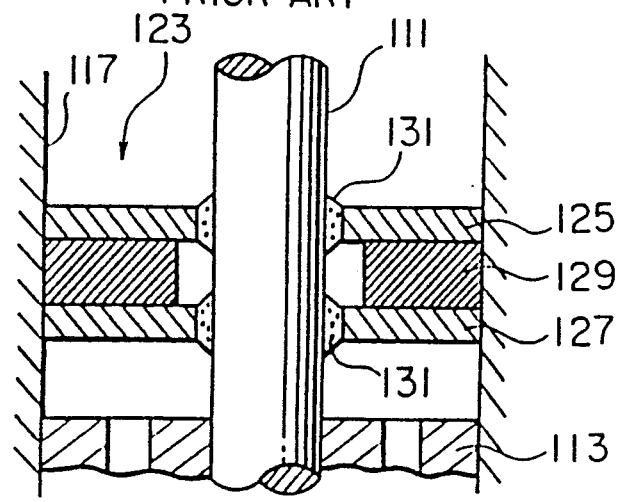
FIG. 2 is a substantially sectional view showing an arrangement of a conventional magnetic fluid sealing apparatus.
Figure 3:
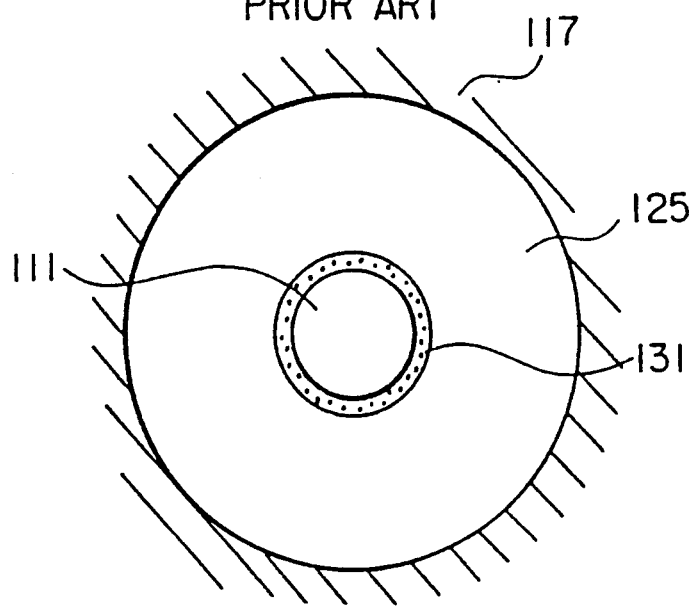
FIG. 3 is a plan view showing an arrangement of the conventional magnetic fluid sealing apparatus shown in FIG. 2.
Figure 4A:
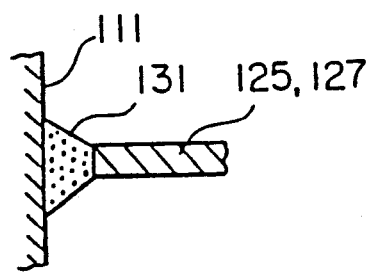
FIGS. 4A and 4B are views for explaining a behavior of a magnetic fluid of the conventional magnetic fluid sealing apparatus shown in FIG. 2.
Figure 4B:
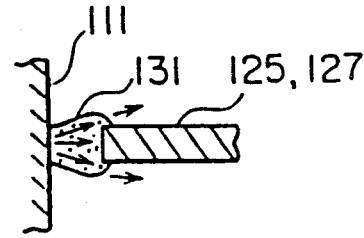
Figure 5:
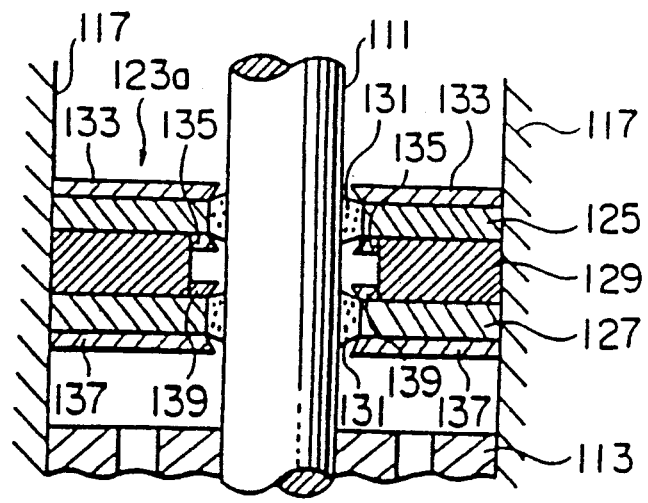
FIG. 5 is a substantially sectional view showing an arrangement of a magnetic fluid sealing apparatus according to an embodiment of the present invention.

FIG. 5 shows an arrangement of a magnetic fluid sealing apparatus according to an embodiment of the present invention. A magnetic fluid sealing apparatus 123a shown in FIG. 5 is provided in the magnetic disk drive shown in FIG. 1. That is, the magnetic fluid sealing apparatus 123a is located above a bearing 113 so as to rotatably close a portion between a central shaft 111 of a spindle motor 105 as a shaft member provided at a rotation center and a cylindrical member 117 concentrically arranged as an external member outside the central shaft 111.

The magnetic fluid sealing apparatus 123a comprises magnetic circuit forming means constituted by two pole pieces 125 (upper side) and 127 (lower side) which are annular plates consisting of a magnetic material, and an annular magnet 129 sandwiched between the pole pieces 125 and 127. The inner diameter of the magnet 129 of the magnetic circuit forming means is set to be larger than that of the pole pieces 125 and 127. Therefore, the inner peripheral portions of the pole pieces 125 and 127 project toward the central shaft 111, and a magnetic circuit is formed between the magnetic circuit forming means and the central shaft 111 by using the pole pieces 125 and 127 as magnetic poles.

This magnetic circuit holds the magnetic fluid 131 between the inner peripheral portions of the pole pieces 125 and 127 and the central shaft 111, thereby air-tightly closing a portion therebetween.

Annular scattering preventing members 133 (outside) and 135 (inside) are formed outside and inside (on the upper and lower surfaces of) the pole piece 125, respectively, so as to project from the magnetic circuit forming means side toward the central shaft 111. Each of the scattering preventing members 133 and 135 consists of a non-magnetic material, and its inner surface (at the magnetic fluid side) is tapered.

Scattering preventing members 137 (outside) and 139 (inside) having a similar arrangement are formed outside and inside (on the upper and lower surfaces of) the pole piece 127.

Figure 6A:
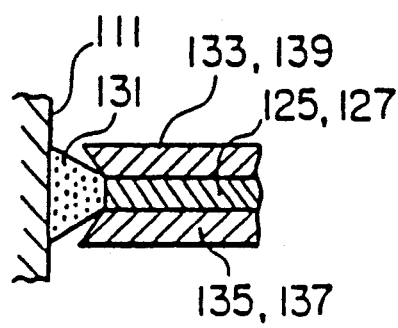
FIGS. 6a and 6b are views for explaining a behavior of a magnetic fluid of the magnetic fluid sealing apparatus of the embodiment shown in FIG. 6.

In the magnetic fluid sealing apparatus 123a having the above arrangement, the magnetic fluid 131 is normally held between the inner peripheral portions of the pole pieces 125 and 127 and the central shaft 111 by the magnetic circuit, as shown in FIG. 6A.

Figure 6B:
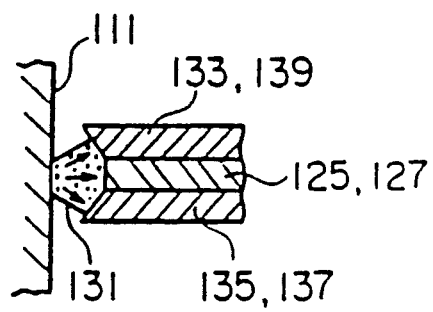

In the above magnetic fluid sealing apparatus 123a, when the cylindrical member 117 in which the pole pieces 125 and 127 and the magnet 129 are fixed is rotated at high speed, e.g., 3,600 rpm, a strong centrifugal force acts on the magnetic fluid 131. If this centrifugal force exceeds a magnetic force for holding the magnetic fluid 131, the magnetic fluid 131 tends to move in the radial direction. As shown in FIG. 6B, however, this movement of the magnetic fluid is limited by the scattering preventing members 133 and 135 and the scattering preventing members 137 and 139 formed on the upper and lower surfaces of the pole pieces 125 and 127, respectively. Therefore, scattering of the magnetic fluid 131 to a surrounding portion is prevented.

According to the magnetic fluid sealing apparatus 123a of the embodiment as described above, scattering of the magnetic fluid 131 can be prevented by an effect of a centrifugal force. Therefore, a sealing property of the magnetic fluid sealing apparatus 123a is not degraded, or a peripheral equipment component such as the magnetic disk 103 is not contaminated by the magnetic fluid 131.

Figure 7:
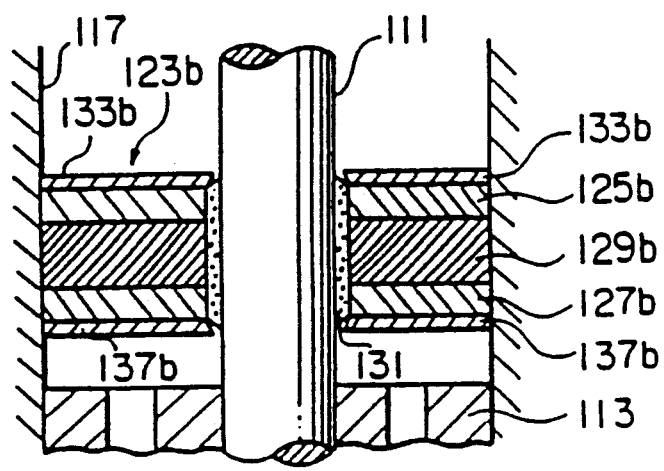
FIG. 7 is a substantially sectional view showing an arrangement of another embodiments of the present invention.

FIG. 7 shows an arrangement of a magnetic fluid sealing apparatus 123b according to another embodiment of the present invention.

In the magnetic fluid sealing apparatus 123b of this embodiment, the inner diameter of each of pole pieces 125b and 127b is set to be substantially equal to that of a magnet 129b sandwiched therebetween, and a magnetic fluid 131 is held between the inner circumferential surfaces of the substantially linearly arranged pole pieces 125b and 127b and the inner circumferential surface of the magnet 129b. Annular scattering preventing members 133b and 137b consisting of a non-magnetic material are formed outside (on the upper surface of) the pole piece 125b and outside (on the lower surface of) the pole piece 127b, respectively, so as to project from magnetic circuit forming means toward a central shaft 111.

The magnetic fluid sealing apparatus 123b having the above arrangement can achieve the same effect as obtained by the magnetic fluid sealing apparatus 123a.

In the above embodiments, the inner circumferential surfaces of the scattering preventing members 133, 135, 137, 139, 133b, and 137b are tapered. The present invention, however, is not limited to those embodiments, and the shape of the scattering preventing member can be variously modified. In addition, as described above, the magnetic fluid sealing apparatuses 123a and 123b can be provided not only above the bearing 113 but also below the bearing 115.

Furthermore, in the above embodiments, the magnetic fluid sealing apparatus according to the present invention is applied to a rotating mechanism of a magnetic disk drive. The present invention is applicable to any magnetic fluid sealing apparatus subjected to a centrifugal force.

As has been described in detail above, according to the present invention, a magnetic fluid is not scattered by an effect of a centrifugal force. Therefore, there is provided a magnetic fluid sealing apparatus in which a sealing property of the magnetic fluid sealing apparatus is not degraded and a peripheral equipment component is not contaminated by the magnetic fluid.

What is claimed is:

1. A magnetic fluid apparatus for sealing an area between a shaft member provided at a rotation center and an external member concentrically arranged outside said shaft member, comprising:

magnetic circuit forming means, fixed to said external member, for forming a magnetic circuit between said magnetic circuit forming means and said shaft member;

magnetic fluid held between said shaft member and said magnetic circuit forming means by said magnetic circuit; and scattering preventing means for preventing scattering of said magnetic fluid to surrounding areas, said scattering preventing means arranged close to said magnetic fluid and having a distal edge with a tapered surface projecting from said magnetic circuit forming means toward said shaft member, said edge being spaced from said shaft member.

2. An apparatus according to claim 1, wherein said magnetic circuit forming means includes two annular pole pieces each having opposing interior surfaces and each having an exterior surface opposite a respective interior surface, said magnetic circuit forming means further including an annular magnet sandwiched between said interior surfaces of said pole pieces, said scattering preventing means having portions disposed adjacent said exterior surfaces of said pole pieces.

3. An apparatus according to claim 2, wherein said scattering preventing means includes portions disposed adjacent said interior and exterior surfaces of said magnetic pole pieces.

4. An apparatus according to claim 3, wherein said portions of said scattering preventing means each include an edge projecting toward and spaced from said shaft, said edges each being tapered away from an adjacent surface of a pole piece.

5. An apparatus according to claim 1, wherein said scattering preventing means comprising a non magnetic material.

6. An apparatus according to claim 1, wherein said shaft member provided at the rotation center is a central shaft of a spindle motor for rotating a magnetic disk in a hard disk drive.

7. A magnetic fluid apparatus for sealing an area between a shaft member provided at a rotation center and an external member concentrically arranged about said shaft member, comprising:

magnetic circuit forming means, fixed to said external member, for forming a magnetic circuit between said magnetic circuit forming means and said shaft member, said magnetic circuit forming means having opposite sides;

magnetic fluid held between said shaft member and said magnetic circuit forming means by said magnetic circuit; and scattering preventing means for maintaining magnetic fluid in an area substantially adjacent said magnetic circuit forming means and for preventing scattering of said magnetic fluid out of said adjacent area, said scattering preventing means including non-magnetic material, arranged close to said magnetic fluid, and having portions attached to opposite sides of said magnetic circuit forming means, and projecting from said magnetic circuit forming means toward said shaft member.

8. An apparatus according to claim 7, wherein said magnetic circuit forming means comprises two annular pole pieces and an annular magnet sandwiched between said pole pieces, said scattering preventing means having portions disposed on exterior surfaces of said pole pieces.

9. An apparatus according to claim 7, wherein a surface of said scattering preventing means opposing said magnetic fluid is tapered.

10. An apparatus according to claim 7, wherein said shaft member is provided at the rotation center is a central shaft of a spindle motor for rotating a magnetic disk in a hard disk drive.

* * * * *